United States Patent [19]

Engler

[11] Patent Number: 5,156,297
[45] Date of Patent: Oct. 20, 1992

[54] BEVERAGE STAND WITH QUANTITY INDICATOR

[75] Inventor: Christopher J. Engler, Portland, Oreg.

[73] Assignee: Boyd Coffee Company, Portland, Oreg.

[21] Appl. No.: 565,509

[22] Filed: Aug. 10, 1990

[51] Int. Cl.$^5$ .............................................. B67D 5/06
[52] U.S. Cl. ........................................ 222/23; 222/77; 222/135; 222/173; 141/83; 177/230
[58] Field of Search .................... 222/23, 26, 29, 77, 222/135, 173, 179.5, 582, 31; 141/83; 177/260, 261, 230

[56] References Cited

U.S. PATENT DOCUMENTS

| | | | |
|---|---|---|---|
| 2,551,219 | 5/1951 | Peters et al. | 99/382 |
| 2,881,693 | 4/1959 | Wells et al. | 99/307 |
| 3,031,022 | 1/1962 | Atchison | 177/230 |
| 3,034,417 | 5/1962 | Bunn | 99/283 |
| 3,863,724 | 2/1975 | Dalia, Jr. | 222/77 |
| 4,027,783 | 6/1977 | Branch et al. | 222/26 |
| 4,202,387 | 5/1980 | Upton | 222/23 |
| 4,513,796 | 4/1985 | Miller et al. | 222/77 |
| 4,640,483 | 2/1987 | Tufte | 248/311.2 |
| 4,811,872 | 3/1989 | Boyd | 222/610 |

Primary Examiner—Kevin P. Shaver
Assistant Examiner—Philippe Derakshani
Attorney, Agent, or Firm—Kolisch, Hartwell, Dickinson, McCormack & Heuser

[57] ABSTRACT

A beverage quantity indicator is provided for use with beverage containers of a type which do not include a visual or other type of indication of the quantity of beverage remaining in the container. The indicator is incorporated into a beverage stand and includes a weight scale for weighing beverage containers on the stand, thus providing an indication of the quantity of beverage within the container. A preferred form of beverage stand is also disclosed. The weight scale on the stand includes a hinge-mounted plate on which a beverage container rests. The hinge-mounted plate is movable generally vertically along an arcuate path. A spring on the beverage stand urges the hinge-mounted plate generally upwardly and the amount of flexure of the spring indicates the quantity of beverage in the container on the plate. A downward-movement inhibitor is included to prevent excessive downward movement of the scale when downward pressure is exerted on the container, such as when dispensing beverages from an airpot-type dispenser which includes a beverage dispensing pump.

16 Claims, 4 Drawing Sheets

BEVERAGE STAND WITH QUANTITY INDICATOR

BACKGROUND AND SUMMARY OF THE INVENTION

This invention relates generally to beverage dispensers and to beverage dispensing stands or servers on which one or more portable beverage dispensing containers are placed, and more particularly to indicators on beverage stands for indicating the quantity of beverage remaining in a beverage container.

A popular type of beverage dispenser, particularly used for hot, brewed beverages such as coffee or tea, is known as an "airpot." Its popularity derives, in part, from its excellent heat retention, which permits coffee or other hot beverages to be brewed well in advance of serving. Partly because of its popularity, devices such as beverage dispensing stands have been developed specifically for use with airpot-type coffee dispensers. An example of such a beverage dispensing stand is described in U.S. Pat. No. 4,811,872, issued to Boyd Coffee Company, assignee of the present invention.

Airpots dispense beverages through a pump device which is operated by pressing downwardly on a handle or lever located on top of the container. By pressing down on the lever, a beverage patron pumps the beverage from inside the container into a cup or other server positioned below the container's spout. Airpot-type beverage containers are popular among coffee and other brewed-beverage serving establishments in part because customers cannot see the quantity of beverage remaining in an airpot. The reason this is an advantage when dispensing coffee is that, given a choice, a patron will usually take coffee from the fullest container in the belief that the coffee therein is fresher. Consequently, a container of coffee which is less than half full will tend to be ignored when positioned next to a full or nearly-full container. This has been found to be true regardless of the age or quality of the coffee being offered.

In contrast to many types of coffee containers, airpot-type containers are generally opaque and the user is given no visual indication of how full the container is. In normal usage, airpot-type containers are not lifted or moved by the user, due to their pump-type serving action. In fact, airpots are sometimes housed in beverage stands which lock them into place to prevent unauthorized removal, for example, the stand shown in U.S. Pat. No. 4,811,872. Therefore, in the usual situation, a patron can neither see the beverage inside an airpot nor lift the container to gain information about the fullness of the container. Furthermore, airpot-type containers maintain the freshness of coffee to such an extent that it is ordinarily not possible to detect the length of time coffee has been standing in the container. For all these reasons, airpot-type beverage containers do not indicate, either to the user or the coffee provider, the quantity of coffee in the container.

Despite the fact that an airpot-type beverage container does not provide a ready indication of the quantity of beverage remaining inside, such information would be useful to beverage providers. It would also be useful to provide such information to the beverage patron, in certain circumstances. Such information would permit beverage providers and patrons to keep a supply of beverage in the beverage container, allowing for maximum usage of the airpot-type beverage dispenser/container.

It would be advantageous to incorporate such a beverage quantity indicator into a beverage stand designed for use with airpot-type beverage containers so that quantity indication is provided without the necessity of moving the beverage container or otherwise inconveniencing the beverage provider.

It would also be advantageous to provide a beverage quantity indicator on a beverage stand for use with airpot-type beverage containers which provides beverage quantity information to selected locations on the beverage stand, including providing quantity indicators on both the front and back of the beverage stand.

It is an object of the present invention to provide a beverage quantity indicator for an airpot-type beverage container, or other similar types of beverage containers, which is usable with a beverage stand and which indicates the relative quantity of beverage in the container.

It is a further object of the present invention to provide such a beverage quantity indicator in the form of a weight scale for weighing the container, the scale being usable with containers which dispense beverages by means of a downward-movement pump-type dispensing action. In particular, a beverage quantity indicator is provided which incorporates a movement inhibitor, which limits the downward movement of a beverage container supported on the scale, whenever downward pressure is exerted on the beverage container, such as when a customer actuates a downward-moving pump-type dispenser.

Accordingly, the present invention provides a beverage quantity indicator for use with a beverage stand on which a beverage container is supported, the beverage quantity indicator comprises a weight scale on the beverage stand for measuring the relative weight of beverage containers thereon. The scale is used to indicate the relative quantity of beverage in the beverage container.

In its preferred form, the beverage quantity indicator of the present invention includes a scale having a movable frame on which a beverage container is supported, the frame being attached to the beverage stand by means of a hinge which pivots the frame around a generally horizontal axis. A spring is functionally interposed between the arcuate-moving frame and the beverage stand. An indicator associated with the scale indicates the amount of flexure of the spring to provide an indication of the quantity of beverage in the container resting on the movable support frame of the scale. In addition, the preferred embodiment of the invention includes means for adjusting the weight range or other measuring parameters indicated by the scale.

The quantity indicator further includes a movement inhibitor for limiting the downward movement of a beverage container on the beverage stand when downward pressure is exerted on the beverage container. Such downward pressure is ordinarily exerted on the container when dispensing beverages therefrom by means of a downward-moving pump-type actuator. The movement inhibitor prevents excessive downward movement of a beverage container supported on the scale. As such, the action of a user of the pump-type dispenser will not cause excessive downward movement of the scale.

DETAILED DESCRIPTION OF THE PREFERRED EMBODIMENT

Figure 1:
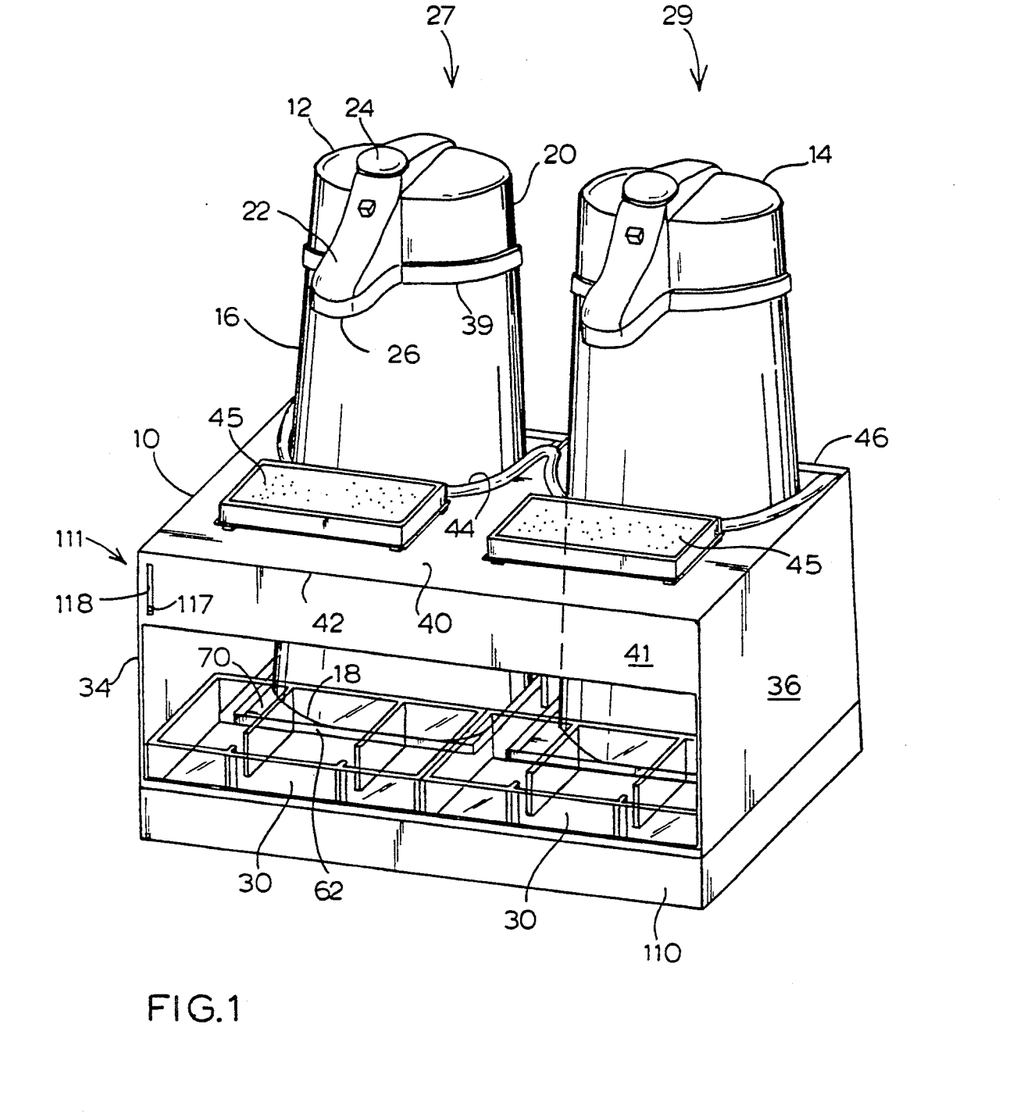
FIG. 1 is a front isometric view of a double-wide beverage and condiment dispensing server or stand which includes two beverage serving stations, together with two beverage containers, and a beverage quantity indicator in accordance with the present invention for each container associated with each serving station.

Referring to FIG. 1, a beverage stand or beverage server 10 is shown with facilities for holding two beverage containers 12 and 14 thereon. Beverage containers 12 and 14 are each separate, self-contained containers and dispensers of the "airpot" type. Such beverage containers are generally well insulated, each having a vacuum bottle-type internal construction which retains the temperature of beverages therein for many hours. Referring to beverage container 12, which is a prior-art container of the same type as beverage container 14, the container includes a body 16 having a generally frusto-conical external shape tapering from a small top to a larger, generally circular bottom 18 and having a top 20 which is removable to fill or clean the container. Incorporated into top 20 is a beverage dispenser spout 22 through which liquid beverage flows when dispensed. A pump-type handle 24, located on top of container 12, is used to produce a flow of beverage from the interior of container 12 out through dispensing spout 22 to a beverage-receiving cup or glass positioned below the spout overhang 26, adjacent the container. As shown in the figures, pump handle 24 is in its folded position, resting against removable top 20. In use, handle 24 will be raised to an operating position (not shown) above the top of the beverage container. Pump handle 24 is operated by exerting downward pressure on handle 24 one or more times to produce a pumping action. When in its raised, operative position, pump handle 24 is spring-loaded and will return to its operative starting position after each downward stroke of the pump.

Beverage stand 10, alternatively called a beverage server, is a device for holding and supporting one or more beverage containers 12, 14, and for facilitating the dispensing of beverages therefrom. Stand 10 is an improved version of the beverage server shown and described in U.S. Pat. No. 4,811,872. Stand 10 includes two beverage serving stations 27 and 29, each of which separately holds a beverage container 12, 14, respectively. The stand also provides space for condiment dispensing receptacles 30 for such beverage ingredients as sugar, creamers, tea bags or the like. Receptacles 30 are made of plastic and are removable from the stand for cleaning and refilling. In FIG. 1, receptacles 30 are depicted as clear plastic. FIGS. 2-6, to the extent they show the location of receptacles 30, omit the receptacles for clarity.

Figure 2:
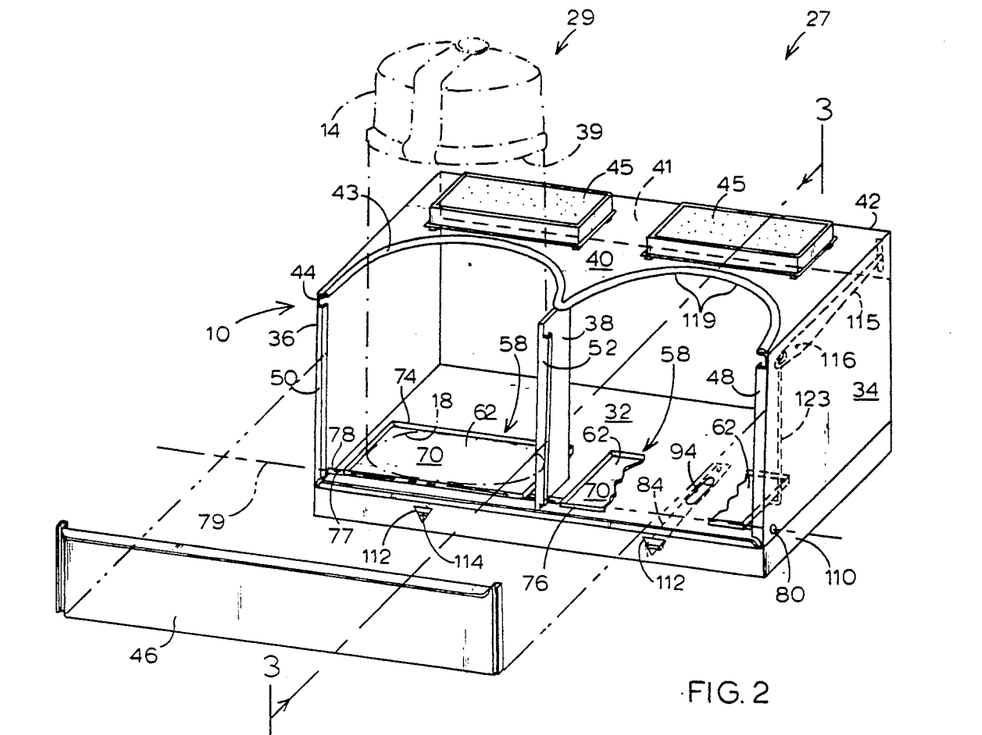
FIG. 2 is a rear, isometric view, partially exploded and partially cut away, of the beverage stand shown in FIG. 1.

Referring to FIG. 2, beverage stand 10 is shown with beverage container 14 in phantom. Stand 10 includes a base plate or platform 32, also referred to as base 32, which is a generally horizontal plate on which the one or more beverage containers are supported. Condiment receptacles 30 (not shown in FIG. 2) are also supported on base plate 32. Stand 10 further includes sidewalls 34, 36, which in the illustrated embodiment are generally vertical panels, and a central support post in the form of a generally vertical panel 38. Panels 34, 36 and 38 are generally perpendicular to base plate 32.

Above base plate 32 and generally parallel therewith is a positioner panel 40 extending between side panels 34 and 36. Positioner panel 40 serves to locate or position beverage containers 12 and 14 relative to stand 10. Positioner panel 40 has a front edge 42 which extends along the front of stand 10, a front panel 41 depending from edge 42 along the front of stand 10 (see FIG. 1), and a contoured back edge 44, which follows a generally semicircular path around each serving station 27 and 29 to form two recesses in back edge 44. Each semicircular recess formed in edge 44 of positioner plate 40 is dimensioned and generally configured to partially surround a beverage container on the stand. Contoured rear edge 44 is preferably covered or partially covered with a non-abrasive conforming material such as vinyl 43 to cushion the edge and prevent scratching of the outer surface of the beverage containers. Two cup-receiving pads 45 rest on the upper surface of positioner plate 40, one for each serving station, providing a convenient location below the dispensing spouts of the containers on which to place beverage-receiving cups or the like.

Figure 3:
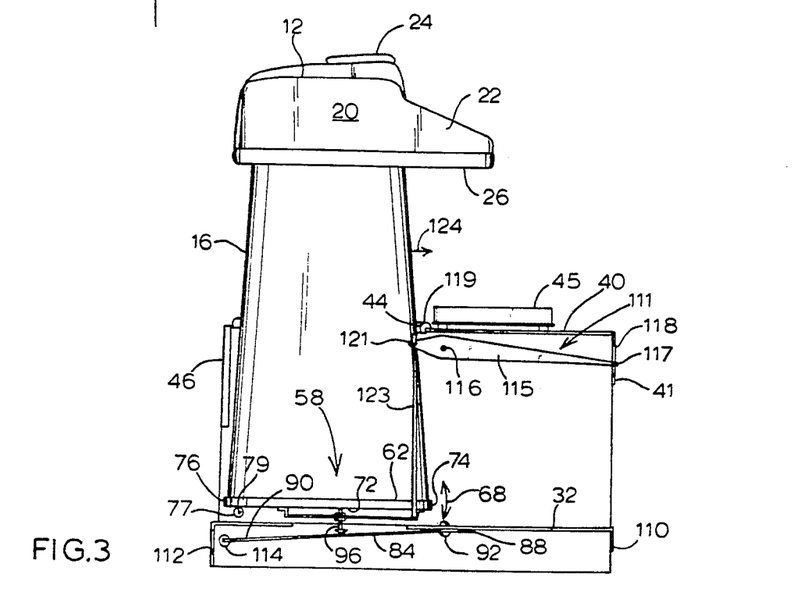
FIG. 3 is a side cross-sectional view of the beverage stand shown in FIGS. 1 and 2, taken along line 3—3 of FIG. 2, together with the front panel indicator overlaid on the cross-sectional view, illustrating parts of the weighing scale used with the beverage quantity indicator of the present invention.

Referring to FIGS. 1, 2 and 3, the sides of each beverage container 12, 14 are frusto-conical in shape, tapering upwardly from a generally circular base 18 to a smaller, generally circular top end 39 to which detachable top 20 is attached. Like the beverage server disclosed in U.S. Pat. No. 4,811,872, beverage stand 10 incorporates means for securing one or more beverage containers to the stand to prevent unauthorized removal of containers. That is accomplished by providing a detachable rear panel 46 which attaches to the rear edges of side panels 34, 36 and/or center upright panel 38 in order to surround and enclose one or more containers on the stand 10. As in U.S. Pat. No. 4,811,872, the rear, nearly vertical edges 48, 50, 52 (FIG. 2) of side panels 34, 36 and center panel 38, respectively, taper upwardly toward the front of beverage stand 10 at an angle generally conforming to or nearly equal to the angle of the frusto-conical sides 16 of the beverage containers. Back panel 46 is detachably attachable to the back edges 48, 50, 52 of stand 10, by means (not shown) of a lock, latch or other device such as that shown in U.S. Pat. No. 4,811,872. The back panel 46, together with stand 10, confine the containers 12, 14 within an enclosure which is smaller than the diameter of the circular base 18 of each beverage container. Consequently, the beverage containers on stand 10 cannot be removed from the stand until back panel 46 is detached, as described more fully in U.S. Pat. No. 4,811,872.

Figure 4:
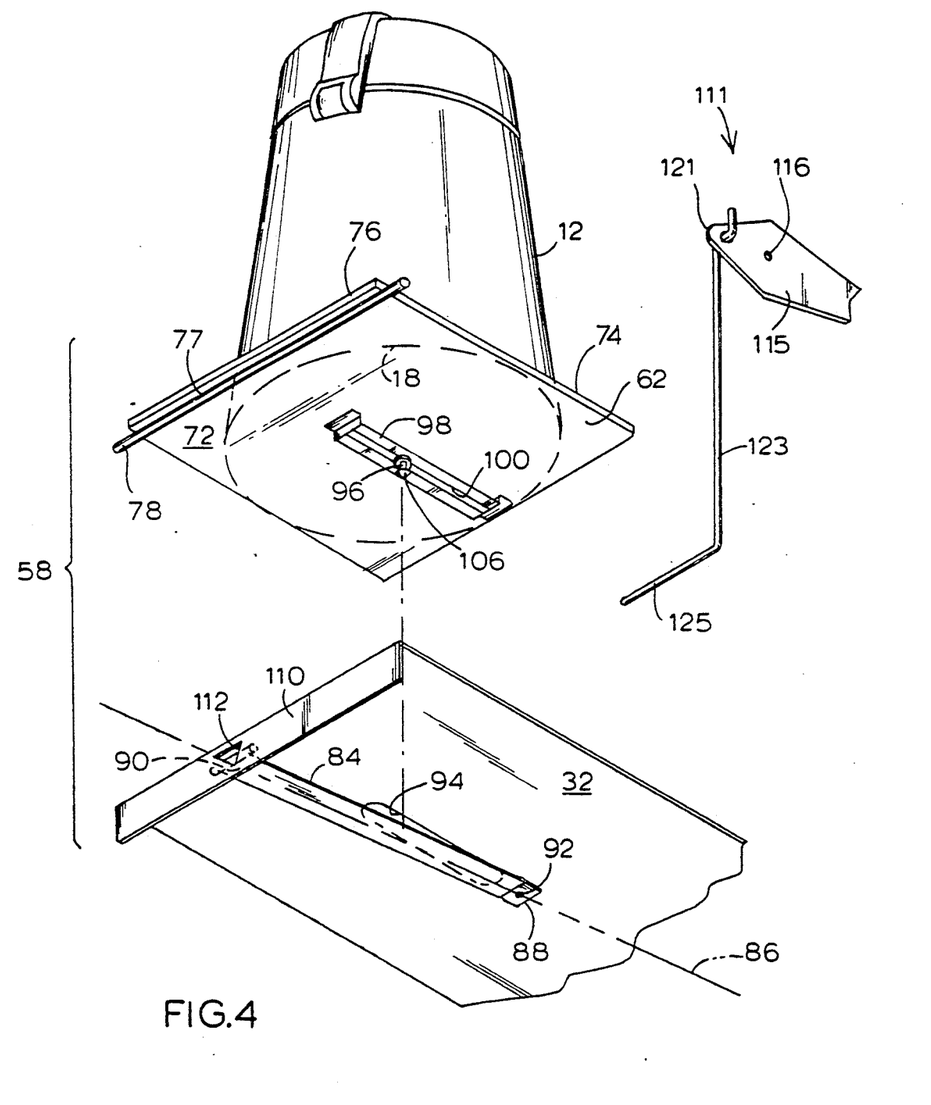
FIG. 4 is a partial, schematic, exploded isometric view of a portion of the beverage stand shown in FIGS. 1 and 2, as viewed from generally below the beverage stand.

The following description of the elements of the beverage quantity indicator of the present invention refers only to serving station 27 and associated beverage container 12. All elements of the present invention associated with serving station 27 are repeated in identical serving station 29 and it should be understood that a beverage stand could be constructed in accordance with the present invention containing only a single serving station or three or more serving stations. Referring to FIGS. 2-4, the beverage quantity indicator of the present invention includes a weight scale or other equivalent device for measuring the weight or mass of objects. The weight scale is built into stand 10, generally on and incorporated into base plate 32, also referred to as platform 32, for measuring the weight of the one or more beverage containers supported on stand 10. The views of the weight scale shown in FIGS. 3, 4, 5 and 6 apply equally to either serving station 27 or 29 on stand 10.

Weight scale 58 is a scale for measuring the relative weight of a beverage container 12 on serving station 27 of stand 10. Scale 58 comprises a beverage dispenser support frame 62 on which beverage container 12 rests. Frame 62 is supported above base plate 32 for movement generally vertically with respect to beverage stand 10, over a limited range of movement. Movement of frame 62 is generally toward and away from base plate 32, in the manner described below. Frame 62 is in the form of a rectangular or square plate and includes top surface 70, bottom surface 72, and side edges extending peripherally around frame 62. Referring to FIG. 4, frame 62 is generally flat and includes an upturned lip 74 extending around the periphery of the plate along the side edges of the frame. Frame 62 is preferably made of stainless steel or another suitable metal, or of a molded plastic material. Frame 62 is preferably slightly larger in length and width than the diameter of the circular bottom 18 of beverage container 12. In that way, beverage container 12 will rest on plate 62 within the peripheral upturned lip 74, restricting and preventing movement of container 12 on plate 62.

In the preferred embodiment, the generally vertical movement of frame 62 is provided for by a hinge 77 attached adjacent one side edge of the plate. Hinge 77 includes a generally horizontal pivot axis 79 around which the plate pivots, permitting generally arcuate movement of frame 62 along a path indicated by arrows 68 (FIG. 3). The edge of frame 62 adjacent pivot axis 79 of hinge 77 is called the first edge 76 of frame 62. In the preferred embodiment, hinge 77 is in the form of a tubular member 78 attached to frame 62 adjacent first edge 76 by welding, fastening or another suitable technique. Hinge 77 is completed by passing a rod or pin through tubular sleeve 78. The rod or pin which forms the central member around which hinge 77 rotates (not shown) is supported by the side plates 34, 36 and center plate 38 of stand 10. It extends along pivot axis 79 through holes formed slightly above the point where side plates 34, 36 and center plate 38 meet base plate 32. A hole through which the end of such a rod or pin extends is shown in FIG. 2 at 80.

Because hinge 77 and associated pivot axis 79 are positioned adjacent one of the side edges of frame 62, namely, first side edge 76, the generally arcuate movement of frame 62 along path 68, toward and away from base plate 32, produces a generally vertical, arcuate movement of plate 62 with respect to stand 10. The arcuate movement of frame 62 results in arcuate movement of a container supported on the frame, as well.

Referring to FIGS. 3, 4, 5 and 6, weight scale 58 further includes a spring 84 functionally interposed between container support frame 62 and beverage stand 10. In the preferred embodiment, spring 84 is a generally horizontal elongated resilient member or arm, preferably formed of spring steel or a similar resilient material. It is elongated along a longitudinal axis 86 and has a first end 88 and a second end 90. Spring 84 is attached to the underside of base 32 adjacent the first end 88 of the spring. Attachment is effected by any conventional means, such as a bolt or rivet 92 passed through spring 84 adjacent first end 88. Second end 90 of spring 84 is movable by flexure of the resilient spring steel. Movement of second end 90 is along a generally arcuate path 91 (FIG. 5) between an upper position where spring 84 rests generally against the underside of base plate 32, and a lower position where spring 84 has been flexed downwardly by exertion of a downward force at a point between first and second ends 88, 90, respectively.

An opening 94 extends through base plate 32 of beverage stand 10, through which an operative connection is effected between the movable plate of frame 62 and spring 84. Opening 94 is preferably an elongated slot-like opening extending lengthwise generally along and overlying spring 84 along longitudinal axis 86.

Extending downwardly from the underside of movable plate 62 is a downwardly-extending member 96. Member 96, shown most clearly in FIGS. 4, 5 and 6, protrudes from the bottom surface of frame 62, supported on a bracket 98 attached to frame 62 (see FIG. 4) Bracket 98 includes a central slot 100 which extends generally parallel to the longitudinal axis of spring 86. Downwardly extending member 96 is preferably in the form of a long bolt on which a pair of cooperating nuts 102, 104 are fastened over and under bracket 98, respectively. Bolt 96 forms a rigid linkage extending downwardly from frame 62 to contact spring 84 at a location spaced-apart from the point of attachment of spring 84 to stand 10, at 92. Downwardly-extending member 96 extends through slot 100 and, by loosening nuts 102, 104, can be repositioned anywhere along slot 100. The combination of slot 100 and nuts 102, 104 permit selective adjustment in the length and position of member 96 to adjust the weight range and general orientation of the parts of scale 58, in the manner described below.

Figure 5:
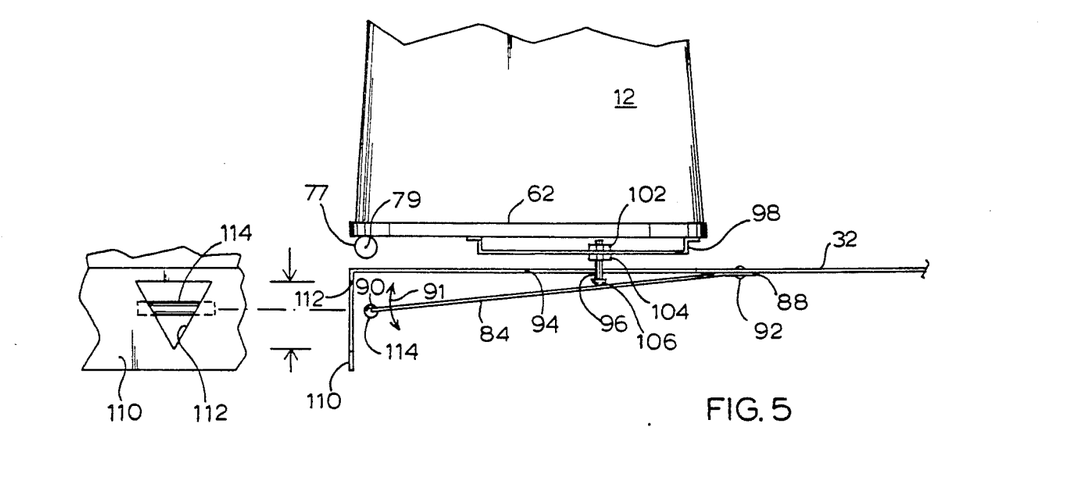
FIG. 5 is a side, partial, cross-sectional view, taken along line 3—3 of FIG. 2, of the beverage stand and quantity indicator shown in FIGS. 1-4, with portions of the front panel weight indicator removed, showing the weighing scale on an enlarged scale, together with an inset illustration of the weight indicator on the back panel of the beverage stand.
Figure 6:
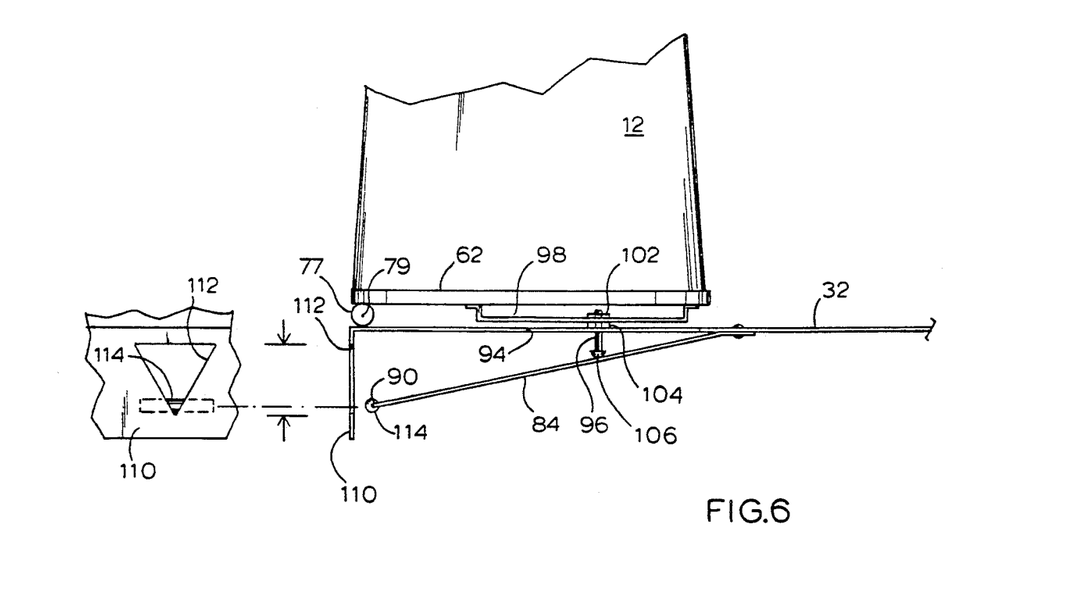
FIG. 6 is a partial side cross-sectional view as in FIG. 5 showing the beverage quantity indicator with a larger quantity of beverage in the beverage container.

Referring to FIGS. 5 and 6, downwardly extending member 96 extends through elongated opening 94 in base plate 32, and engages and contacts spring 84. Acting through member 96, spring 84 urges plate 62 upwardly along its arcuate path of movement 68 (FIG. 3). If an ordinary bolt is used for member 96, bolt head 106 will ride against spring 84, providing a suitable surface for an effective slidable engagement between the two parts. Spring 84 urges frame 62 upwardly by acting against bolt 96.

In order to accommodate the workings of scale 58, as well as its twin scale at second beverage serving station 29, a downwardly extending skirt 110 extends below base 32 of beverage stand 10, around the lower periphery of the stand. Skirt 110 supports the base plate 32 of the beverage stand above the surface on which the stand rests, allowing room for the downward flexing of spring 84. Skirt 110 also provides an exterior surface on which weight indicators 112 are provided on the back side of stand 10 for indicating the relative weights measured on the scales (see FIG. 2).

Referring to FIGS. 5 and 6, rear panel indicator 112 for first beverage serving station 27 is illustrated in rear partial and side cross-sectional views. The second movable end 90 of spring 84 is movable by flexure of the resilient spring member generally along path 91. Spring 84 is positioned on base plate 32 so that second end 90 is generally adjacent the interior of one surface of downwardly extending skirt 110, on the back side of stand 10. Indicator opening 112 is formed in skirt 110, providing a viewing aperture adjacent the second end of the spring for observing the amount of flexure of the spring. The observed position of second end 90 of spring 84 indicates the quantity of beverage in a container supported on scale frame 62.

In the preferred embodiment, indicator viewing aperture 112 is triangular and has a downwardly-extending point. As will be readily appreciated by those skilled in the art, weight scale 58 will indicate a higher weight when spring 84 flexes downwardly by a larger amount and will indicate less weight when spring 84 flexes downwardly by a lesser amount. Consequently, the distance which second end 90 has moved downwardly from the horizontal is an approximate indication of the relative weight of the object on support plate 62 of scale 58. Thus, as the weight on scale 58 lessens, spring 84 moves upwardly, raising second end 90 upwardly toward the wide end of triangular opening 112. To make it easier to see second end 90 of spring 84, a brightly colored indicator bar 114 is installed over second end 90 of spring 84. The indicator bar 114 is in the form of a plastic sleeve, cut lengthwise along one side, into which second end 90 of the spring is inserted. Alternatively, a lamp or brightly painted surface could be installed on second end 90 of spring 84 to enhance visibility.

FIG. 6 illustrates the approximate position of indicator 114 when a beverage container 12 resting on scale 58 is nearly full. As will be understood by those skilled in the art frame 62 changes position relative to stand 10 in response to changes in the weight resting on frame 62. Changes in the position of frame 62, in turn, produce changes in the position of indicator 114 on second end 90 of spring 84. FIG. 5 illustrates the approximate position of indicator 114 when a certain amount of beverage has been removed from container 12, reducing the weight of the container. As can be seen, the level of spring 84 rises as the weight on scale 58 is reduced. Thus, indicator 114 acts as a position-responsive display device on stand 10 which responds to changes in the position of frame 62.

An alternative weight indicator for scale 58 is also provided in the form of indicator 111 on front panel 41. Referring to FIGS. 3 and 4, front panel weight indicator 111 includes a position-responsive display device which, like indicator 114, is responsive to changes in the position of movable frame 62. Front panel weight indicator 111 comprises a pivot arm 115 pivotally attached to side panel 34 of stand 10 for free rotational movement about a pivot point 116, which also serves as the point of attachment between pivot arm 115 and side panel 34. A first end 117 of pivot arm 115 serves as a visual indicator which protrudes through a cooperating slot-type opening 118 in front panel 41 of the stand. As shown in FIG. 1, the generally pointed first end 117 of pivot arm 115 is preferably bent 90° from the remainder of the pivot arm, both to limit protrusion of end 117 through opening 118 and to increase the visibility of the indicator. The second end 121 of the pivot arm, opposite first end 117, is attached to a depending or hanging position sensor, in the form of wire 123, which engages movable frame 62 and moves therewith. Position sensor 123 preferably includes a horizontal leg 125 (FIG. 4) which extends beneath movable frame 62 of scale 58.

The configuration of the various parts of front panel indicator 111 causes horizontal leg 125 of wire 123 to "ride" against the underside of frame 62. That is because pivot point 116 of pivot arm 115 is substantially closer to second end 121 of the arm, than to the pointer at first end 117. Since pivot arm 115 is mounted for rotational movement around a generally horizontal pivot axis 116, the result of the greater weight on first end 117 is that it moves downwardly. As a result, second end 121 and attached depending sensor wire 123 are automatically carried upwardly, causing horizontally-extending side leg 125 to rise into contact with the underside of the plate forming movable frame 62. As such, position sensor wire 123 will act as a "follower" which moves up and down simultaneously with the up and down movement of the free (i.e., unhinged) end of movable frame 62. As sensor wire 123 moves up and down, it will cause the indicator pointer at first end 117 of pivot arm 115 to likewise move, although due to the see-saw type mounting for pivot arm 115, movement will be in the opposite direction.

Front panel position indicator 111 provides an alternative display device for displaying the relative weight of the beverage container on scale 58. It is an optional indicator which is particularly useful for beverage stand installations where the back side of the stand is not readily visible to either patrons or preparers. As shown in the figures, only serving station 27 has been provided with a front panel quantity indicator, although it will be readily understood that both serving stations 27 and 29 could be so equipped, if desired. The availability of a front panel quantity indicator allows for selective provision of quantity indicators on the beverage stand, at one or more locations desired by the user.

When back plate 46 is installed on the back side of stand 10, it encloses container 12 and prevents unauthorized removal, as described above. That is accomplished by dimensioning the opening between back plate 46 and contoured edge 44 to be smaller than the overall diameter of the bottom 18 of container 12. That does not mean, however, that container 12 is rigidly locked into an immovable position between back plate 46 and contoured edge 44. In fact, because of the tapered sides of the frusto-conical sidewalls 18 of container 12, the container has a smaller diameter above base 18 than at base 18. Consequently, there is sufficient room between the stand and container 12 at the level of positioner plate 40 to permit arcuate movement of container 12 as it rests on and rotates with frame 62.

Since airpot-type beverage containers are operated by the user exerting downward pressure on a portion of the top of the container (lever 24), resulting in downward pressure on the container itself, the quantity indicator of the present invention preferably includes a movement inhibitor for limiting downward movement of the scale and a beverage container thereon. Like the platform on any scale, support frame 62 is spring-loaded and free to move up and down around pivot axis 79, resulting in a free-floating springy "feel" which could be bothersome to those attempting to use the pump mechanism on the beverage container. The provision of a downward movement inhibitor prevents damage to scale 58 due to excessive downward movement of beverage container support frame 62 and also prevents excessive bobbing or bouncing of a beverage container on the scale as it is being pumped to dispense the beverage it contains.

Referring to FIGS. 2 and 3, and limiting the discussion to beverage station 27, with the understanding that the description applies equally to parallel beverage station 29, the downward movement inhibitor of the preferred embodiment is incorporated into positioner plate 40. As discussed above, positioner plate 40 includes a generally semicircular-shaped contoured back edge 44 for each serving station. Contoured edge 44 partially surrounds and is dimensioned to matingly engage a beverage container on beverage stand 10 The structure of the movement inhibitor includes at least a portion of contoured edge 44, centrally disposed along the base or bottom of the contour, termed a first surface 119. First surface 119 is that portion of positioner plate edge 44 which touches and engages the side of beverage container 12 when the container pivots forward toward cup pad 45 as frame 62 rotates around pivot axis 79. Referring to FIG. 3, first surface 119 is dimensioned and located so that the body 16 of container 12 will rotate in the direction of arrow 124 into contact with first surface 119 when downward pressure is exerted on top 20 of the container. Contact between container 12 and surface 119 is caused when support plate 62 moves arcuately downwardly toward base plate 32 against the force of spring 84. It may turn out that a large fraction of the length of contoured edge 44 will constitute the line of contact between positioner plate 40 and container 12, depending on the relative dimensions of the container, contoured edge 44 and the amount of cushioning applied to contoured edge 44.

The invention provides a beverage quantity indicator which is viewable from the back of a beverage stand, thus giving information about the quantity of beverage remaining in each container to the person preparing and offering beverages. The beverage quantity indicator functions with a minimum of moving parts. It is of simple, rugged construction which will stand up to heavy usage. Beverage stands of the preferred embodiment incorporating the beverage quantity indicator system of the present invention retain many of the advantages of the beverage dispensing server disclosed in U.S. Pat. No. 4,811,872, including the provision of a beverage stand which prevents unauthorized withdrawal of the coffee dispenser from the stand. The weight scale of the indicator system is adjustable to accommodate beverage containers of different weights by simply adjusting the position or length of bolt member 96 on bracket 98. For example, containers which are heavier, are accommodated by sliding bolt member 96 away from hinge axis 79 and toward spring attachment end 88, increasing the upward spring pressure exerted by spring 84. The range of weights observable through opening 112 in the side of beverage stand 10 can be adjusted conveniently by lengthening or shortening bolt 96, using nuts 102, 104 to reposition the length of bolt 96. Adjustment of the scale can also be effected by slightly bending spring 84. As can be readily appreciated, the weights indicated by scale 58 are relative weights, between full and partially empty containers, not exact weights in pounds or ounces. Information is thus provided as to the relative quantity of beverage in the container, relative as to the quantity of beverage in the container before beverage was withdrawn.

Alternative beverage quantity indicators incorporated into beverage servers or stands are possible within the scope of the present invention. Although a particular configuration of weight scale is shown in the preferred embodiment, other types of weight scales which employ coil springs or other types of springs can be made within the scope of the present invention. A scale with a straight up-and-down movable frame, on which the beverage container rests, could be used. An electronic or balance scale might alternatively be used. A non-arcuate up-and-down scale mechanism could employ a movement inhibitor in the form of a dashpot-type device to slow or stop rapid downward movement when pressure is exerted on the beverage container. An electric or electronic indicator could be added to the scale of the preferred embodiment, to alert a person tending the beverage stand to a low beverage condition in one or more of the beverage containers. Other alternative embodiments within the scope of the present invention will occur to those skilled in the art.

A beverage quantity indicator for airpot-type beverage containers has been provided, the indicator indicating the relative quantity of beverage remaining in the beverage container. The quantity indicator is incorporated into a beverage stand designed for use with airpot-type beverage containers. Quantity indication is provided without the necessity of moving the beverage container or otherwise inconveniencing the beverage provider. The beverage quantity indicator is usable with and incorporated into a beverage stand which permits the beverage container thereon to be secured to the stand.

What is claimed is:

1. A beverage quantity indicator for use with a beverage stand for supporting a pump-type beverage container which dispenses a beverage contained therein in response to downward pressure on a portion of the container, the beverage quantity indicator comprising:

a weight scale on the stand having a frame for supporting a beverage container thereon, the frame being movable downwardly along an arcuate path when a weight is resting thereon, whereby a beverage container supported on the weight scale will move along an arcuate path together with the frame, a weight indicator on the stand operatively connected to the scale for indicating the amount of downward movement of the frame, thereby indicating the relative quantity of beverage in a beverage container supported on the weight scale, and a container-engaging surface supported on the stand above the frame, the container-engaging surface being positioned to contact a portion of a beverage container supported on the frame as it moves downwardly along an arcuate path, which limits the downward arcuate movement of the frame and beverage container when downward pressure is exerted on the beverage container during the dispensing of a beverage therefrom, whereby excessive downward movement of the frame and beverage container is prevented.

2. A beverage quantity indicator as in claim 1 including means on the stand for securing one or more pump-type beverage containers to the stand to prevent unauthorized removal of containers from the stand.

3. A beverage quantity indicator as in claim 2 in which said means for securing includes a positioner on said beverage stand supported above said frame which partially surrounds and positions beverage containers on said beverage stand, and wherein said container-engaging surface is located on said positioner.

4. A beverage quantity indicator as in claim 3 in which said positioner includes a contoured edge which is generally configured to partially surround a beverage container on said beverage stand, said contoured edge including said container-engaging surface thereon.

5. A beverage quantity indicator as in claim 1 in which said movable frame is attached to the beverage stand by means of a hinge which includes a generally horizontal pivot axis, wherein the movement of said frame, and of the beverage container supported thereon, is generally arcuate.

6. A beverage quantity indicator as in claim 5 in which said scale includes a spring functionally interposed between said frame and said beverage stand.

7. A beverage quantity indicator for use with a beverage stand on which a beverage container is supported, the beverage quantity indicator comprising:
   a weight scale, including a movable frame for supporting a beverage container thereon and a spring functionally interposed between said frame and said beverage stand, said spring being an elongate resilient member having first and second ends which is attached to the beverage stand adjacent said first end, said second end being movable by flexure of said resilient member, and
   a hinge for attaching said movable frame to the beverage stand, the hinge including a generally horizontal pivot axis, wherein the movement of said frame, and of a beverage container supported thereon, is generally arcuate.

8. A beverage quantity indicator as in claim 7 including a beverage stand having said resilient member attached thereto adjacent said first end of said resilient member and having a viewing aperture adjacent said second end of said resilient member for observing the amount of flexure of said resilient member, whereby the observed position of said second end of said resilient member indicates the quantity of beverage in a beverage container supported on said scale.

9. A beverage quantity indicator for use with a beverage stand on which a beverage container is supported, the beverage quantity indicator comprising:
   a generally horizontal platform,
   a weight scale including a frame movably supported above said platform having top and bottom surfaces and side edges for supporting a beverage container thereon, said frame being attached to said beverage stand by means of a hinge having a generally horizontal pivot axis, said hinge being attached to said frame adjacent a first side edge thereof, whereby the operative movement of said frame generally toward and away from said platform is generally arcuate, and
   a spring functionally interposed between said frame and said beverage stand, the weight scale serving to weigh a beverage container on said frame, thereby indicating the relative quantity of beverage in the beverage container.

10. A beverage quantity indicator as in claim 9 in which said spring is in the form of a resilient arm having first and second ends, said spring being attached to said beverage stand below said platform at a location adjacent said first end of said arm, and including a rigid linkage extending downwardly from said frame and contacting said arm at a location spaced apart from the point of attachment of said arm to said beverage stand such that said frame is urged upwardly by said arm and said member.

11. A beverage stand for pump-type beverage containers, the stand being of the type which secures one or more beverage containers to the stand to prevent unauthorized removal thereof, the beverage stand comprising:
   a base,
   a scale on said base for weighing a beverage container secured thereon,
   said scale including a movable frame for supporting a beverage container thereon, the frame being movable downwardly along an arcuate path when a weight is resting thereon, whereby a beverage container supported on the weight scale will move along an arcuate path together with the frame,
   a weight indicator, whereby the relative weight of a beverage container on said frame indicates the relative quantity of beverage in the container, and
   a container-engaging surface supported on the stand above the frame, the container-engaging surface being positioned to contact a portion of a beverage container supported on the frame as it moves downwardly along an arcuate path, which limits the downward arcuate movement of the frame and beverage container when downward pressure is exerted on the beverage container during the dispensing of a beverage therefrom, whereby excessive downward movement of the pump-type beverage container on said scale is prevented.

12. A beverage stand for indicating the quantity of beverage in a beverage container supported on the stand, comprising:
   a base,
   a scale on said base for weighing a beverage container thereon,
   said scale including a generally horizontal movable frame having a top surface on which a beverage container rests, and side edges along the periphery of said frame,
   a hinge for attaching said frame to said base, said hinge being attached to said frame adjacent a side edge thereof, said hinge including a generally horizontal pivot axis, whereby said frame moves generally vertically relative to said beverage stand along an arcuate path,
   said scale further including a spring functionally interposed between said frame and said base for urging said frame upwardly, and
   a weight indicator for indicating the weight measured by said scale, whereby the relative weight of a beverage container on said scale indicates the relative quantity of beverage in the container.

13. A beverage stand for indicating the quantity of beverage in a beverage container supported on the stand, comprising:
   a base,
   a scale on said base for weighing a beverage container thereon,
   said scale including a movable frame,
   a spring in the form of an elongated, generally flat arm having first and second ends, said arm being attached to said base adjacent said first end and said second end being movable by flexure of said arm, said spring being functionally interposed between said frame and said base for urging said frame upwardly, said second movable end of said spring serving as a weight indicator in which the amount of movement of the second movable end of said arm indicates the weight of a beverage contained on said scale.

14. A beverage stand as in claim 11 in which the position of said movable frame relative to said base changes in response to changes in the weight on said movable frame, and said weight indicator includes a position-responsive display device on the beverage stand responsive to the position of said movable frame, whereby said display device indicates the relative weight on said movable frame of said scale.

15. A beverage stand as in claim 11 in which said container-engaging surface is mounted on a positioner supported on said base above said frame, and said positioner is a member which partially surrounds and engages a beverage container supported on the stand.

16. A beverage stand as in claim 15 in which said positioner includes a contoured edge which is generally configured to partially surround a beverage container on said base, said contoured edge including said container-engaging surface thereon.

* * * * *